United States Patent Office 2,746,886
Patented May 22, 1956

2,746,886

METHOD OF COATING SILICIOUS MATERIAL WITH INDIUM

Richard B. Belser, Tucker, Ga., assignor to Georgia Tech Research Institute, Atlanta, Ga., a corporation of Georgia No Drawing. Application July 9, 1951, Serial No. 235,889

4 Claims. (Cl. 117—123)

This invention relates generally to a method of coating silicious materials with a metal, and more particularly to the coating of silicious material with the metal indium and indium rich alloys.

Prior art methods for bonding metals to glass, porcelain, quartz, mica, ceramics and other silicious materials for decorative or utilitarian purposes have required professional skill, extensive equipment, and complicated manipulation, thus limiting and making expensive, or inferior, the resulting products.

It is an object therefore of my invention to provide a method by which a metal may be conveniently used for the purpose of coating silicious materials for decorative and utilitarian purposes.

Another object of my invention is to provide a method by which the metal indium, and indium rich alloys, may be used to coat silicious materials.

According to my invention, glass, quartz, mica, porcelain, steatite, tile, brick, concrete and other silicious materials may be coated with indium rich substances comprising the metal indium, or more than 75% of the metal indium alloyed with lesser percentages by weight of silver, gold, copper, lead or aluminum, by cleaning the silicious material with a detergent or other agent, coating the end of a small heated tool with such indium rich substance in order to fuse the indium rich substance, and flowing the fused substance onto the silicious material by a writing, rubbing, drawing, or other suitable motion. Adhesion will occur when the fused substance at the point of contact with the silicious material is slightly above the fusing temperature of the indium rich substance. No flux is necessary.

Having thus described my invention, it will be obvious to those skilled in the art that I have provided a method of great convenience and usefulness, and that adaptations and modifications may be made without departing from the scope of my invention as defined in the following claims.

I claim:

1. The method of coating a silicious material with metal, comprising cleaning the silicious material to be coated, fusing an indium rich substance containing more than 75% of the metal indium alloyed with a metal of the class of face-centered cubic crystals, and flowing the fused indium rich substance onto the silicious material at a temperature slightly above the point of fusion of said indium rich substance.

2. The method according to claim 1 in which the indium rich substance contains more than 75% of the metal indium alloyed with a metal selected from the group consisting of gold, silver, copper, lead and aluminum.

3. The method according to claim 1 in which the silicious material is of the class of metallic oxides consisting of glass, quartz, mica, porcelain, steatite, tile, brick and concrete.

4. The method of coating a silicious material with metal, comprising cleaning the silicious material to be coated, fusing the metal indium by heating, and flowing the fused indium onto the silicious material by a drawing motion and at a temperature slightly above the point of fusion of the metal indium.

References Cited in the file of this patent

UNITED STATES PATENTS

| 527,210 | Margot | Oct. 9, 1894 |
| 2,348,358 | Phillips et al. | May 9, 1944 |

OTHER REFERENCES

Rose: Scientific American, April 1944, pages 154–156.

Lewis: Notes on Soldering, Tin Research Institute, England, March 1948 (only pages 54 and 55 relied upon).